(12) United States Patent
Ewert

(10) Patent No.: US 11,807,242 B2
(45) Date of Patent: Nov. 7, 2023

(54) SITUATION-DEPENDENT CONTROL OF VEHICLE SENSORS AND/OR COMPONENTS

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 62 days.

(21) Appl. No.: 17/430,528

(22) PCT Filed: Apr. 15, 2020

(86) PCT No.: PCT/EP2020/060568
§ 371 (c)(1),
(2) Date: Aug. 12, 2021

(87) PCT Pub. No.: WO2020/216658
PCT Pub. Date: Oct. 29, 2020

(65) Prior Publication Data
US 2022/0126832 A1    Apr. 28, 2022

(30) Foreign Application Priority Data

Apr. 25, 2019 (DE) .......................... 102019205900.7

(51) Int. Cl.
*B60W 40/04* (2006.01)
*B60W 10/24* (2006.01)
*B60W 10/30* (2006.01)

(52) U.S. Cl.
CPC ............ *B60W 40/04* (2013.01); *B60W 10/24* (2013.01); *B60W 10/30* (2013.01);
(Continued)

(58) Field of Classification Search
CPC ...... B60W 10/24; B60W 10/30; B60W 40/04; B60W 2420/52; B60W 2420/54; B60W 2520/04
(Continued)

(56) References Cited

U.S. PATENT DOCUMENTS

| 2017/0166222 A1* | 6/2017 | James | G05D 1/0088 |
| 2017/0221359 A1* | 8/2017 | Kamata | G08G 1/167 |

(Continued)

FOREIGN PATENT DOCUMENTS

| JP | 2007170864 A | 7/2007 |
| JP | 2009196487 A | 9/2009 |

(Continued)

OTHER PUBLICATIONS

International Search Report for PCT/EP2020/060568, dated Jul. 16, 2020.

*Primary Examiner* — Atul Trivedi
(74) *Attorney, Agent, or Firm* — NORTON ROSE FULBRIGHT US LLP; Gerard Messina

(57) ABSTRACT

A method for controlling sensors or components of a vehicle, using a control device. Measurement data of at least one sensor of the vehicle being received and evaluated. A traffic situation, in which the vehicle finds itself, is ascertained by evaluating the measurement data; and the at least one sensor and/or at least one component of the vehicle being activated, deactivated and/or set to a standby mode as a function of the ascertained traffic situation. A control device and a computer program are also described.

16 Claims, 2 Drawing Sheets

(52) U.S. Cl.
CPC ..... *B60W 2420/52* (2013.01); *B60W 2420/54* (2013.01); *B60W 2520/04* (2013.01)

(58) Field of Classification Search
USPC .......................................................... 701/36
See application file for complete search history.

(56) References Cited

U.S. PATENT DOCUMENTS

| | | | |
|---|---|---|---|
| 2017/0259753 A1* | 9/2017 | Meyhofer | B60R 11/04 |
| 2017/0291560 A1* | 10/2017 | Schroeder | B60T 8/92 |
| 2017/0364629 A1* | 12/2017 | Tarte | B60Q 3/80 |
| 2017/0366935 A1 | 12/2017 | Ahmadzadeh et al. | |
| 2017/0371060 A1* | 12/2017 | Nogueira-Nine | G01S 15/04 |
| 2018/0072313 A1* | 3/2018 | Stenneth | G01S 17/89 |
| 2018/0090009 A1* | 3/2018 | Roessler | G08G 1/096708 |
| 2018/0272963 A1 | 9/2018 | Meyhofer et al. | |
| 2019/0049958 A1* | 2/2019 | Liu | G01S 17/00 |
| 2019/0382018 A1* | 12/2019 | Garnault | B60W 30/18163 |
| 2020/0033863 A1* | 1/2020 | Staudacher | G05D 1/0257 |
| 2020/0039528 A1* | 2/2020 | Ewert | G01S 7/4021 |
| 2022/0324440 A1* | 10/2022 | Ewert | B60W 60/0015 |
| 2023/0091772 A1* | 3/2023 | Frye | H04W 4/44 |
| | | | 701/25 |

FOREIGN PATENT DOCUMENTS

| | | | |
|---|---|---|---|
| JP | 2012093240 A | 5/2012 | |
| JP | 2014075026 A | 4/2014 | |
| JP | 2015153429 A | 8/2015 | |
| JP | 2017197150 A | 11/2017 | |

\* cited by examiner

SITUATION-DEPENDENT CONTROL OF VEHICLE SENSORS AND/OR COMPONENTS

FIELD

The present invention relates to a method for controlling sensors or components of a vehicle, using a control device; to a control device; and to a computer program.

BACKGROUND INFORMATION

At or above a particular degree of automation, vehicles having automated driving functions may be operated autonomously and without a driver. The vehicle may follow the course of a road, e.g., automatically, detect other road users or obstacles independently, and compute the corresponding control commands in the vehicle and transmit them to actuators in the vehicle, through which the path of travel of the vehicle is influenced. In the case of a fully autonomous vehicle, the driver is not involved in the driving action.

Vehicles, which are presently used and may be operated in an automated manner, include a plurality of surround sensors. The surround sensors are used, for example, to discern the surroundings of the vehicle. On the basis of algorithms, the sensor data of the surround sensors may be evaluated, and, for example, objects in the surroundings of the vehicle may be detected. The sensor data influence the planning of a trajectory of the vehicle and, consequently, the subsequent control of the vehicle actuators, through which the autonomous driving function is implemented.

The surround sensors for such automated driving functions are present in variety and redundancy. For example, a vehicle operable in a fully automated manner may include up to forty surround sensors. Due to the power consumption of the surround sensors, the surround sensors may have, during operation, a disadvantageous effect on the cruising range of vehicles powered electrically.

SUMMARY

An object of the present invention is to provide a method for reducing a power demand of a vehicle, in particular, of a vehicle operable in an automated manner.

This object may be achieved with the aid of the respective subject matter of example embodiments of the present invention. Advantageous refinements and example embodiments of the present invention are disclosed herein.

According to one aspect of the present invention, a method for controlling sensors or components of a vehicle, using a control device, is provided. In accordance with an example embodiment of the present invention, in one step, measurement data of at least one sensor of the vehicle is received and evaluated. A traffic situation, in which the vehicle finds itself, is ascertained by evaluating the measurement data. In a further step, the at least one sensor and/or at least one component of the vehicle is activated, deactivated and/or set to a standby mode as a function of the ascertained traffic situation.

According to a further aspect of the present invention, a control device is provided; the control device being configured to execute the method.

In addition, according to one aspect of the present invention, a computer program is provided, which includes commands that, in response to the execution of the computer program by a computer or a control device, cause it to carry out the method of the present invention.

The control device may preferably be installed in a vehicle. In this connection, according to the BASt standard, the vehicle may be operable in an assisted, semiautomated, highly automated, and/or fully automated or driverless manner.

The at least one sensor may be part of a surround sensor system or at least one sensor of the vehicle. In particular, the at least one sensor may be a lidar sensor, radar sensor, ultrasonic sensor, camera sensor, and the like. In addition, the at least one sensor may be a temperature sensor and/or a sensor of an engine control unit and/or engine control system. The at least one sensor may also be a part, a group of the surround sensor system, or the entire surround sensor system. The at least one component may take the form of a control device, a control unit, actuators, motors, electronic components, lamps, airbag sensors, airbag control units, and the like.

In accordance with an example embodiment of the present invention, by determining the traffic situation, the need for sensors may be ascertained, which is necessary for safely controlling and navigating the vehicle within the traffic situation or through the traffic situation. This may allow part of the surround sensor system or of the remaining sensors of the vehicle to be deactivated or set to a standby mode, if they are not needed. Conversely, deactivated sensors or sensors set to the standby mode may be reactivated, if this necessary for mastering the traffic situation.

Since a portion of the sensors and/or components are not used by the method as a function of the situation, the power consumed by the vehicle to operate the sensors and/or components may be decreased. In particular, a cruising range of electrically operated vehicles may be increased by the method, since a portion of the sensors and components of the vehicle may be switched off or set to the standby mode.

Preferably, the sensors and/or components of the vehicle may be used by the control device as a function of the situation. To this end, sensors and/or components may be decoupled from an electrical power supply or reconnected to the electrical power supply. Alternatively, or in addition, the at least one sensor and/or the at least one component may also be set to the standby mode.

In accordance with an example embodiment of the present invention, it is preferable for the sensors and/or components of a vehicle operated in an automated manner and/or operated electrically to be able to be switched on or off as a function of need, in order to keep the power consumption of the vehicle as low as possible. To this end, different examples of non-limiting application cases and/or traffic situations may be taken into account for the operating modes of the vehicle:

A vehicle operable in an automated manner approaches an intersection; a traffic light in front of the vehicle being switched to red, and the vehicle not being able to travel on, but having to brake in front of the traffic light.

A vehicle operable in an automated manner is operated on a clear expressway.

A vehicle operable in an automated manner is operated in a city zone.

A vehicle operable in an automated manner is operated in ideal or bad weather.

In order to execute the method, for example, an intelligent algorithm for switching on and/or switching off surround sensors or control devices may be implemented in the control device. Based on a current driving scenario, such as the switching of a traffic light or a parking operation, this algorithm is able to deactivate or activate particular surround sensors or control devices or set them to a standby mode or to awaken the at least one sensor from the standby mode.

In one specific embodiment of the present invention, the intelligent algorithm for switching on and/or switching off surround sensors may take the form of a neural network or of artificial intelligence. The intelligent algorithm may include parameters from the surroundings of the vehicle as input variables. Such parameters may include, for example, the switching of a traffic light and phase duration of the traffic light, the position of further road users relative to the vehicle, a vehicle speed, a vehicle position in a GNSS coordinate system or World Coordinate System, and/or an independent position of the vehicle from the transit time of an instance of Car-to-X Communication. Based on these parameters, the intelligent algorithm may determine the state of surround sensors as output variables; an output vector corresponding to the number of surround sensors of the vehicle. In this context, the output vector may be the currently desired sensor state of at least one sensor. For example, the desired sensor state may be a standby mode, deactivation, or activation of the at least one sensor. The intelligent algorithm may be learned, using the corresponding input variables for as many scenarios and/or traffic situations as possible, and applied to the vehicle. In particular, the following advantages may be produced by the method and the control device:

- The power consumption of the vehicle may be decreased by deactivating surround sensors, airbag sensors, control devices, as well as other vehicle components, for example, in a dead stop of the vehicle, or prospectively, prior or subsequent to it.
- The power of the vehicle may also be decreased by setting surround sensors, airbag sensors, control devices, as well as other vehicle components, to a standby mode and subsequently waking the sensors.
- In particular, a cruising range of electrically operated vehicles may be increased by saving energy.
- Since the at least one sensor of the vehicle is in operation for only a limited time period, the lifetime of the at least one sensor may also be increased. In particular, the lifetime of sensors having electromechanical components, for example, lidar sensors having mechanical rotation units, may be increased.

According to a further exemplary embodiment of the present invention, in order to ascertain a traffic situation, an intersection lying ahead in the direction of travel, a traffic light lying ahead in the direction of travel, a traffic jam, an initiated braking maneuver of the vehicle, adjacent road users, a city zone, and a country road or expressway are detected as optimum operating conditions for the at least one sensor and/or as conditions disadvantageous for the at least one sensor. Evaluation of the measurement data of surround sensors of the vehicle by the control device may allow a traffic situation and/or a scenario to be ascertained or assigned to a traffic situation from a predefined list of traffic situations.

If conditions disadvantageous for the vehicle sensor system are detected, the affected sensors may also be switched off. Such disadvantageous conditions may include, for example, rain, dust, snow, contamination of camera sensors or lidar sensors, and the like. The affected sensors may preferably be deactivated, since the ascertained, measured values have a high degree of inaccuracy and/or a low degree of validity. Alternatively, or in addition, in optimum conditions, vehicle sensors present in redundancy may be deactivated, as well, since sufficient accuracy may already be attained by individual sensors.

A traffic-jam situation may be detected as a traffic situation in light of, for example, the vehicle speed, which is additionally or alternatively coupled to a highly accurate vehicle position on a so-called feature map. In this connection, the vehicle may actually be on an expressway, but have a low vehicular speed.

If the vehicle is in a city zone having a relatively high volume of traffic, then a portion of the sensors of the vehicle may be activated or deactivated. In the case of a low volume of traffic, for example, certain sensors may be set to a standby mode, if the vehicle speed is low. An example of this would be long-range radar, which is of little use in a city zone, whereas it is deployed with a high priority on an expressway.

By evaluating the measurement data of vehicle sensors, it may be distinguished whether the vehicle is being operated in good or bad weather. In good weather, surround sensors, which are needed for reliably detecting the vehicle surroundings in all weather conditions, but are redundant in the case of good weather, may be deactivated. The control device of the vehicle, which may switch the sensors on or off, detects the weather conditions and switches the sensors on or off. In bad weather conditions, for example, all of the available surround sensors may be switched on.

According to a further exemplary embodiment of the present invention, the at least one sensor and/or component is deactivated by the control device, as soon as the vehicle stops; the at least one sensor and/or component being activated by the control device, when the vehicle drives on. As soon as the vehicle comes to a stop, complete or partial deactivation of the surround sensors occurs. Alternatively, or in addition, the surround sensors and/or components may be set to a sleep mode or to a standby mode. In this manner, the electrical power, for example, of a drive battery, is saved, when the vehicle is stopped. The sensors and/or components, which are needed for detecting the switching of the traffic light to "green" or for detecting the continued driving of road users traveling ahead, may remain in an awake state and/or activated state.

When the traffic in front of the vehicle continues driving, the surround sensors of the vehicle are switched on gradually or completely as a function of the vehicle speed, so that the vehicle may continue driving in a highly automated manner. In the case of speed-dependent operation of surround sensors, the surround sensors of the vehicle are activated or deactivated as a function of the vehicle speed. For example, ultrasonic sensors may be used at low vehicle speeds. As the vehicle speed increases, radar sensors, camera sensors, and/or lidar sensors may be used.

According to a further exemplary embodiment of the present invention, the at least one sensor and/or component is deactivated or set to a standby mode in response to a dead stop of the vehicle or in response to the initiation of a braking action. Through this, the deactivation of the at least one sensor of the vehicle may be brought about by the control device either as soon as the vehicle has attained shutdown and come to a stop, or else even before the vehicle comes to a dead stop. Stoppage of the vehicle may be determined, for example, by a vehicle wheel speed sensor, acceleration sensors, by static position detection of a GNSS position of the vehicle, and/or by static position detection of a Car-to-X-based position of the vehicle.

As an alternative to deactivation of the at least one sensor, the at least one sensor may also be set to a standby mode. In this connection, the at least one sensor may be operated at a lower transmission rate or at a lower sampling rate. In the case of use of a lidar sensor, it may be operated at a traffic light at a lower rotational speed and/or frequency of oscillation.

In the case of a sensor set to a standby mode, the surroundings of the vehicle may be sampled at increased intervals when the vehicle is stopped, in order to reduce the electrical power needed for operating the sensor. The sampling rate of the at least one sensor may be increased or decreased as a function of the vehicle speed.

If a traffic light, which lies ahead in the direction of travel and is switched to "red," is detected as a traffic situation, then the vehicle may approach this intersection. The vehicle detects this state of the traffic light either by evaluating measurement data of its own surround sensors, or via a Car-to-X communications link with the traffic light. The traffic light may be approached at a reduced speed; the vehicle coming to a stop in time in front of the traffic light. Some of the sensors of the vehicle, which are not needed for decelerating the vehicle to a dead stop at the traffic light and/or in the line of cars at the traffic light, may already be switched off in response to detection of the traffic light switched to "red." For example, the sensors of the vehicle for detecting succeeding traffic and, optionally, the sensors for detecting lateral traffic, may be switched off, while the sensors for preventing lane departure and/or for detecting road users traveling ahead and for detecting the distance from the road users traveling ahead may continue to be powered with electrical energy and operated, until the vehicle comes to a dead stop.

According to a further exemplary embodiment of the present invention, the at least one sensor and/or component is deactivated as a function of the traffic situation and/or prospectively or set to a standby mode. Prospective deactivation of surround sensors is possible, for example, by deactivating the lateral and rear surround sensors of the vehicle already 50 m in front of the traffic light and continuing to operate only the surround sensors pointed forwards or a surround sensor pointed forwards in the direction of travel, in order to bring the vehicle safely to a stop and to detect the distance from vehicles traveling ahead or from the traffic light and/or a stop line.

If a vehicle operable in an automated manner is driven, for example, on a clear expressway, the control device of the vehicle may ascertain the extent to which the surround sensors of the vehicle are needed in the corresponding situation, in order to safely maintain the automated driving function. This may be ascertained, for example, by artificial intelligence or a neural network of the control device. For example, if this artificial intelligence discerns that further road users are beside the vehicle only from time to time, then the corresponding lateral surround sensors may be set to a standby mode or operated at a lower sampling rate or deactivated completely, until the vehicle passes another road user or is passed by another road user. The corresponding passing events may be detected by the front or rear sensors of the vehicle upon the approach of the further road user; in this case, the appropriate lateral surround sensors being reactivated from the standby mode.

Alternatively, or in addition, only certain surround sensors of the vehicle may remain activated as a function of the ascertained traffic situation, while the other surround sensors, such as a long-range radar that is not needed, are set to a sleep mode.

According to a further specific embodiment of the present invention, all of the sensors except for at least one position sensor are deactivated at a distance in front of a stopping position of the vehicle, lying ahead; the vehicle being controlled up to a dead stop at the stopping position with the aid of measurement data of the at least one position sensor and/or measurement data received over a communications link.

The at least one position sensor of the vehicle may be, for example, a vehicle motion and position sensor (VMPS). The vehicle may be operated in an automated manner with the aid of the VMP sensor; the vehicle position being able to be determined precisely on the basis of navigation satellite data, such as GPS, GLONASS, BeiDou or Galileo.

Alternatively, or in addition, the surround sensors may be deactivated already at a defined distance up to the stopping position of the vehicle; the vehicle subsequently being forced safely to a dead stop, using only a highly precise, GNSS-based position or a Car-to-X-based position. In this context, for example, a distance from a stationary vehicle at a traffic light may be detected highly accurately, using a surround sensor pointed forwards. Subsequently, this distance is stored temporarily, and the surround sensors of the vehicle are deactivated or set to a standby mode. With the aid of the highly precise position change of the vehicle from the GNSS sensor or from the transit time of Car-to-X communication signals, the temporarily stored distance may be decremented stepwise, until the distance minus a tolerance is approximately zero, for example, 1 m, and the vehicle has been brought to a dead stop. Due to the prospective deactivation of the surround sensors, the vehicle is in an autonomous coasting mode, in which the surround sensors or a portion of the surround sensors are deactivated and the vehicle may only be forced into a dead stop, using a highly precise position change and a known distance from road users traveling ahead. In this manner, the electrical power consumed by the vehicle sensors may be reduced further.

In a further specific embodiment of the present invention, the switching-on or switching-off of surround sensors of the vehicle may take place via the Car-to-X communications link to at least one infrastructure device or another road user. If there is a Car-to-X communications link between the vehicle and/or the control device and a further road user, then the vehicle may exchange highly accurate positional data with the further road user and carry out its trajectory planning on the basis of these positional changes. Not all of the surround sensors of the vehicle are necessary for planning this trajectory, which means that certain surround sensors may be switched off or set to a sleep mode. For example, redundant surround sensors belong to such surround sensors. In addition, the switching-on or switching-off of surround sensors may be allowed directly by an infrastructure device, in that the infrastructure device transmits certain commands to vehicles of an area that are operated in an automated manner. In this manner, a required minimum performance may be ensured in a particular traffic situation, in a particular area, or in particular weather conditions.

According to a further specific embodiment of the present invention, measurement data from a reduced number of activated sensors are used by the control device for driving the vehicle away over a starting path and/or for accelerating to a setpoint speed. For example, after the traffic-light circuit switches to "green," the surround sensors of the vehicle are restarted and/or reactivated from the standby mode or from a switched-off state. In this connection, the surround sensors pointed forwards and rearwards may initially be started first. Other surround sensors of the vehicle, such as laterally oriented surround sensors, may also be activated only after traveling 25-100 m. This is possible, since, as a rule, no passing maneuvers take place at the traffic light and, as a rule, the vehicle stays in its lane for the first meters. In traffic-jam situations, the surround sensors may be controlled analogously by the control device.

According to a further exemplary embodiment of the present invention, after sensors and/or components are deactivated and/or set to a standby mode, the sensors and/or components are reactivated in a stepwise manner. This may preferably be carried out as a function of a distance traveled, the vehicle speed, the surrounding area, and/or the traffic situation. The vehicle may be controlled in the lane, using a highly precise GNSS position or a Car-to-X-based position of the vehicle. The accurate lane control of the vehicle may be carried out over an acceleration path of, for example, 50 m. During this time, the appropriate surround sensors may be started up in steps. In this connection, the main surround sensors may be started initially, and the redundant surround sensors may be started subsequently. In this manner, even more electrical power may be saved during city driving, since the surround sensors may be switched to an activated state as late as possible after the vehicle drives off again.

According to a further specific embodiment of the present invention, the at least one deactivated sensor and/or component is activated on the basis of measured data evaluated by the control device. According to a further specific embodiment the present invention, the at least one deactivated sensor is activated prospectively. This may already allow the surround sensors to be switched on prospectively. For example, the vehicle may detect the switching of the phase of the traffic light from "red" to "green" and activate the surround sensors immediately. In this connection, at least one camera sensor may remain activated, in order to detect the switching of the traffic light and to be able to start the other surround sensors. Alternatively, in the case of an intelligent traffic light, the switching of the traffic light may also be exchanged between the vehicle and a traffic infrastructure via the Car-to-X communications link. In this case, certain or all surround sensors may already be started shortly before the traffic light switches over. An advantage of this is that certain surround sensors have already been started, when the traffic light reaches its green phase and the vehicle would like to drive off.

According to a further exemplary embodiment of the present invention, the at least one component takes the form of a control device and is deactivated or set to a standby mode in response to a dead stop of the vehicle, an initiated stoppage, or beforehand. Through this, not only may surround sensors be deactivated or partially switched off at a dead stop of the vehicle or shortly before, but also the method may be applied to further sensors and control devices of the vehicle. For example, airbag sensors may be deactivated by the method at a dead stop of the vehicle or already prospectively, since in any case, they are only needed at or above a particular vehicle speed of, for example, 20 km/h. If it is evident that the vehicle is coming to a dead stop due to a red light, then the airbag sensors may already be set to the standby mode or deactivated, when a speed falls below 20 km/h, for example.

In addition, with the aid of the method, control devices and control units of the vehicle may be set to a standby mode or deactivated prospectively. For example, the airbag control device may also be deactivated prospectively or at least for the duration of the red light phase, or under a speed of, e.g., 20 km/h. A control device for powering the drive units with current, or an engine control unit, may be set to a standby mode, as well; with the aid of the highly precise vehicle position, the vehicle only being kept in its lane up to a dead stop, using active actuators. However, certain control devices may continue to remain active, since they are needed for the computation of actuators, control systems, and/or the position change of the vehicle. These include the central vehicle control unit for calculating the trajectory of the vehicle, as well as, for example, a localizing control device, which ascertains the vehicle position based on GNSS signals and/or measurement data or Car-to-X communication signals.

According to a further specific embodiment of the present invention, the at least one sensor and/or component set to the standby mode is powered with electrical energy by at least one internal capacitor, internal battery, and/or by an energy supply on the part of the vehicle. Electrical capacitors are normally present in the surround sensors or control devices. These capacitors may store electrical energy for a certain bridging time. This is then useful, in particular, if the surround sensor is set only to a standby mode, but for the purpose of conserving electricity, the supply line to the surround sensor is not supplied with electrical power. Consequently, the surround sensor is in a standby mode and is powered by the electrical capacitor of the surround sensor. If the surround sensor is started externally from standby mode by a waking command, then the normal powering of the surround sensor is done by the main power supply, for example, from the vehicle battery. In this manner, a surround sensor may be set to a standby mode without being completely shut down.

Alternatively, the surround sensor may also be powered in standby mode via the supply line, in which case the electrical capacitor is omitted.

According to a further specific embodiment of the present invention, the at least one sensor and/or the at least one control device are deactivated by receiving at least one control command; the at least one deactivated sensor and/or the at least one deactivated control device being set to an active operating state by receiving at least one control command. Through this, the surround sensors, as well as control units not needed, may be shut down completely, if they receive the control command from the outside and/or from the control device and are not set to a standby mode. This action is advantageous, if the surround sensors do not include electrical capacitors to bypass the lack of supply of electrical power. In this context, the surround sensors may be shut down by the control command of the control device and restarted by the control command, for example, via a communications line. In this manner, all of the power supplied to the surround sensors may be saved during the deactivation of the surround sensors. However, a prerequisite for this is that the surround sensors may be restarted in a rapid manner from a deactivated state by a waking command and/or by a voltage supply, as well as a power supply.

According to a further exemplary embodiment of the present invention, the at least one sensor is activated, deactivated and/or set to a standby mode as a function of a performance of the trajectory planning and/or of a deviation of an actual position from a setpoint position. Through this, the switching-on and switching-off of the surround sensors of the vehicle may be self-regulated in light of a currently available performance of the trajectory planning and/or of the control of the vehicle actuators and/or of the automated driving function. In this context, a trajectory actually covered by the vehicle is ascertained, for example, with the aid of a highly precise GNSS position, and compared to a preplanned target trajectory. In the event of large differences between a setpoint and actual position, additional surround sensors may be activated and/or switched on to increase the performance. Otherwise, the number of sensors currently used may be decreased by cyclically ascertaining the current performance of the automated driving function, in order to reduce the electrical power needed for operating the surround sensors.

The method may advantageously be linked to a coasting function already implemented in the vehicle. If the vehicle is shifted, for example, into a coasting state, then certain surround sensors of the vehicle may be deactivated, and when the vehicle is accelerated again, they may be activated.

Alternatively, or in addition, the switching-off, deactivation, or the setting of the surround sensors to a standby mode may be linked to an automatic start-stop mechanism already present in the vehicle. If the vehicle is operated in a manual mode, this may allow a dead stop of the vehicle or continued driving to be detected reliably, in order to switch the sensors on or off. For example, deactivation of the surround sensors prior to a dead stop of the vehicle may also be coupled to the "coasting" of the vehicle and/or the deceleration of the vehicle.

In a further specific embodiment of the present invention, the artificial intelligence may be coupled to a feature map. With the aid of a highly precise vehicle position on the feature map, particular surround sensors of the vehicle may be deactivated as a function of the current vehicle position. For example, in residential areas, imaging sensors may be deactivated on the part of the vehicle, in order to ensure the privacy data protection of the pedestrians and residents. This is possible, since the vehicle moves slowly in the residential area, and effective performance of the automated driving is also possible without these sensors.

In the following, preferred exemplary embodiments of the present invention are explained in greater detail in light of highly simplified, schematic representations.

DETAILED DESCRIPTION OF EXAMPLE EMBODIMENTS

Figure 1:
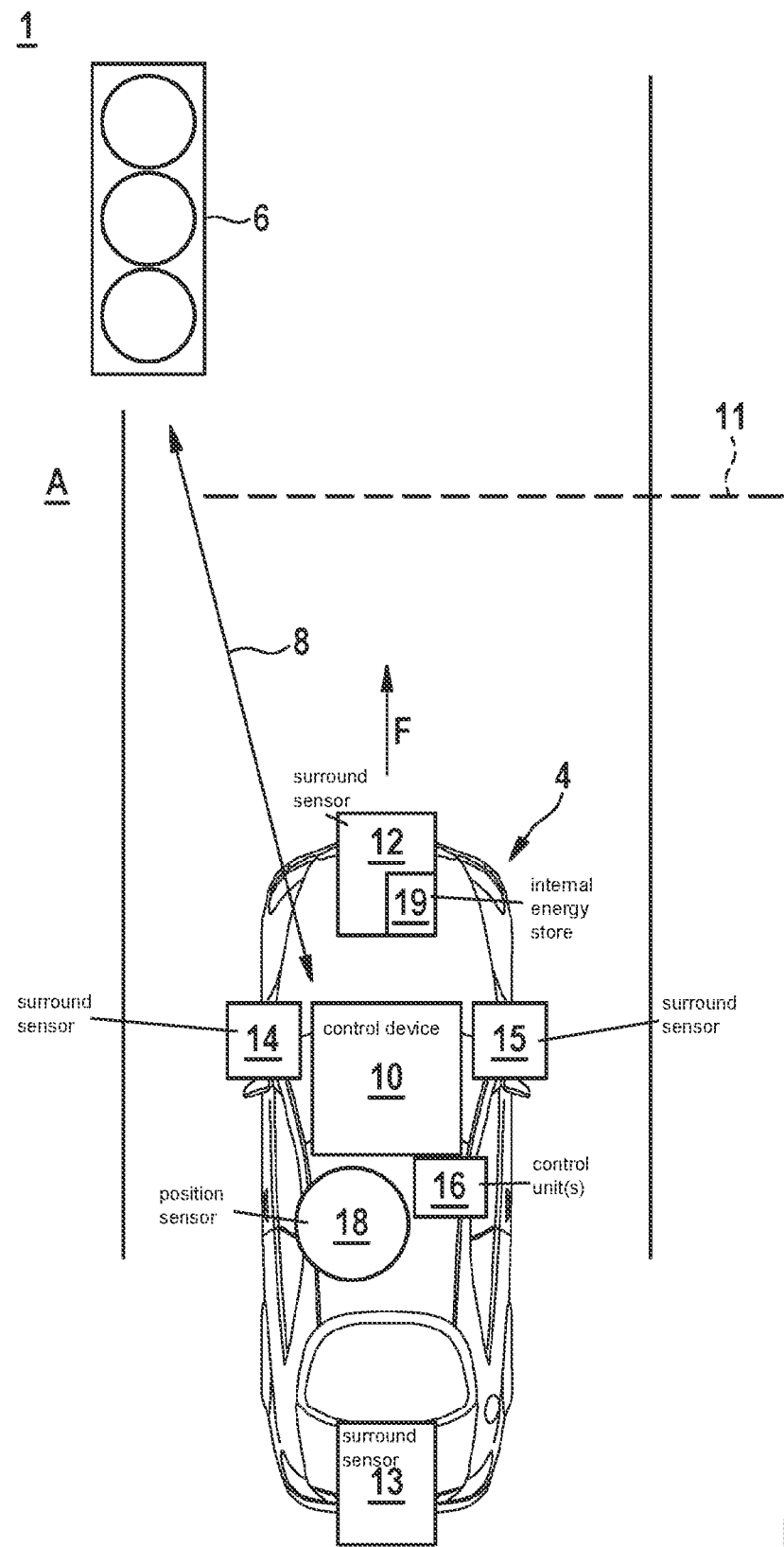
FIG. 1 shows a schematic representation of a set-up for illustrating a method according to the present invention.

FIG. 1 shows a schematic representation of a set-up 1 for illustrating a method 2 according to the present invention.

Set-up 1 includes a vehicle 4, which is approaching a traffic light 6. Vehicle 4 is a vehicle operable in a highly automated manner in accordance with the BASt definition. Traffic light 6 may transmit information items and data to vehicle 4 via a Car-to-X communications link 8.

Communications link 8 is based, for example, on wireless data transmission, such as WLAN, radio, GSM, LTE, UMTS, 5G, and the like.

In particular, a switching state of traffic light 6 may be supplied to vehicle 4 via communications link 8.

Vehicle 4 includes a control device 10. Control device 10 is connected to surround sensors 12, 13, 14, 15 of vehicle 4 in a manner allowing transmission of data. This may allow control device 10 to receive and evaluate the measurement data of surround sensors 12, 13, 14, 15. Surround sensors 12, 13, 14, 15 are used for monitoring and for sampling surroundings A of the vehicle.

Control device 10 may communicate with further control units 16 of vehicle 4, such as airbag control units, and activate or deactivate them.

Surround sensors 12, 13, 14, 15 may take the form of radar sensors 15, camera sensors 12, ultrasonic sensors 13, and lidar sensors 14. Camera sensor 12 is pointed forwards in direction of travel F. Ultrasonic sensor 13 is pointed contrary to direction of travel F. Lidar sensor 14 and radar sensor 15 are laterally directed sensors and monitor a lateral region of vehicle 4.

Vehicle 4 also includes a position sensor 18, which may ascertain GNSS positions of vehicle 4 and transmit them to control device 10.

In order to maintain a standby mode, lidar sensor 12 includes an internal energy store 19, which takes the form of a capacitor. In spite of an interrupted supply of power, this may allow camera sensor 12 to be operated at a reduced sampling rate or to at least maintain rotation. Through this, camera sensor 12 may be reactivated more rapidly.

Figure 2:
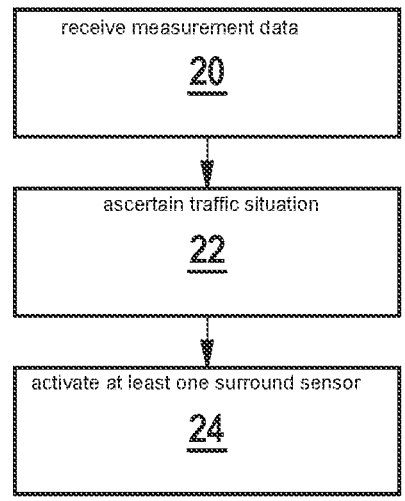
FIG. 2 a schematic flow chart for illustrating the method according to an exemplary embodiment of the present invention.

A schematic flow chart for illustrating the method 2 according to an exemplary embodiment is shown in FIG. 2. Method 2 is used for controlling sensors, in particular, surround sensors 12, 13, 14, 15, of vehicle 4, using control device 10.

In a step 20, measurement data of at least one surround sensor 12, 13, 14, 15 of vehicle 4 are received and evaluated by control device 10.

By evaluating the measurement data, a traffic situation, in which vehicle 4 finds itself or will find itself, is ascertained 22 by control device 10.

According to the exemplary embodiment shown in FIG. 1, vehicle 4 is located in front of a traffic light 6 lying ahead. This may be determined, using data which position sensor 18 receives, or by evaluating the measurement data of camera sensor 12.

In a further step 24, the at least one surround sensor 12, 13, 14, 15 of vehicle 4 is activated, deactivated and/or set to a standby mode as a function of the ascertained traffic situation.

Since traffic light 6 transmits relevant information items beforehand to control device 10 via communications link 8, radar sensor 15, lidar sensor 14, and ultrasonic sensor 13 may already be activated, for example, prior to the stopping of vehicle 4 at a stopping position 11 in front of traffic light 6.

What is claimed is:

1. A method for controlling sensors or components of a vehicle, using a control device, the method comprising the following steps:
   receiving and evaluating measurement data of at least one sensor of the vehicle;
   ascertaining a traffic situation in which the vehicle finds itself, by evaluating the measurement data; and
   activating and/or deactivating and/or setting into standby mode, as a function of the ascertained traffic situation, the at least one sensor and/or at least one component of the vehicle;
   wherein, in response to a dead stop of the vehicle or in response to initiation of a braking action of the vehicle, the at least one sensor is deactivated or set to a standby mode.

2. The method as recited in claim 1, wherein to ascertain the traffic situation, an intersection lying ahead in a direction of travel and/or a traffic light lying ahead in the direction of travel and/or a traffic jam and/or an initiated braking maneuver of the vehicle and/or adjacent road users and/or a city zone and/or a country road and/or an expressway, are detected as operating conditions optimum for the at least one sensor and/or conditions disadvantageous for the at least one sensor.

3. The method as recited in claim 1, wherein the at least one sensor and/or component is deactivated by the control device, as soon as the vehicle stops, and the at least one sensor and/or the at least one component is activated by the control device, when the vehicle drives on.

4. The method as recited in claim 1, wherein the at least one component is deactivated or set to a standby mode in response to the dead stop of the vehicle or in response to initiation of the braking action of the vehicle.

5. The method as recited in claim 1, wherein the at least one sensor and/or the at least one component is prospectively deactivated or set to a standby mode as a function of the ascertained traffic situation.

6. The method as recited in claim 1, wherein all of the sensors except for at least one position sensor are deactivated at a distance in front of a stopping position lying ahead of the vehicle, and the vehicle is forced to stop completely at the stopping position using measurement data of the at least one position sensor and/or using measurement data received over a communications link.

7. The method as recited in claim 1, wherein measurement data from a reduced number of activated sensors are used by the control device for driving the vehicle away over a starting path and/or for accelerating to a setpoint speed.

8. The method as recited in claim 1, wherein after the at least one sensor is deactivated and/or set to a standby mode, the at least one sensor and/or the at least one component are is reactivated in a stepwise manner.

9. The method as recited in claim 1, wherein at least one deactivated sensor and/or component is activated on based on measurement data evaluated by the control device, and the at least one deactivated sensor is activated prospectively.

10. The method as recited in claim 1, wherein the at least one component is in the form of a control device and is deactivated or set to a standby mode in response to: i) dead stop of the vehicle, or ii) an initiated stoppage, or iii) before the dead stop or the initiated stoppage.

11. The method as recited in claim 10, wherein the at least one sensor and/or the at least one control device are deactivated by receiving at least one control command, and the at least one deactivated sensor and/or the at least one deactivated control device are set to an active operating state by receiving another at least one control command.

12. The method as recited in claim 1, wherein the at least one sensor set to the standby mode is powered with electrical energy by at least one internal capacitor and/or internal battery and/or an energy supply of the vehicle.

13. The method as recited in claim 1, wherein the at least one sensor is activated and/or deactivated and/or set to a standby mode as a function of a deviation of an actual position of the vehicle from a setpoint position of the vehicle.

14. The method as recited in claim 1, wherein surround sensors of the vehicle are activated or deactivated as a function of a speed of the vehicle.

15. A control device configured to control sensors or components of a vehicle, the control device configured to:
receive and evaluate measurement data of at least one sensor of the vehicle;
ascertain a traffic situation in which the vehicle finds itself, by evaluating the measurement data; and
activate and/or deactivate and/or set into standby mode, as a function of the ascertained traffic situation, the at least one sensor and/or at least one component of the vehicle;
wherein, in response to a dead stop of the vehicle or in response to initiation of a braking action of the vehicle, the at least one sensor is deactivated or set to a standby mode.

16. A non-transitory computer-readable storage medium on which is stored a computer program for controlling sensors or components of a vehicle, the computer program, when executed a computer, causing the computer to perform the following steps:
receiving and evaluating measurement data of at least one sensor of the vehicle;
ascertaining a traffic situation in which the vehicle finds itself, by evaluating the measurement data; and
activating and/or deactivating and/or setting into standby mode, as a function of the ascertained traffic situation, the at least one sensor and/or at least one component of the vehicle;
wherein, in response to a dead stop of the vehicle or in response to initiation of a braking action of the vehicle, the at least one sensor is deactivated or set to a standby mode.

* * * * *